United States Patent
Tao et al.

(10) Patent No.: US 8,599,741 B2
(45) Date of Patent: Dec. 3, 2013

(54) PROTOCOL DATA UNITS AND HEADER IN MULTIHOP RELAY NETWORK

(75) Inventors: Zhifeng Tao, Allston, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/422,922

(22) Filed: Mar. 16, 2012

(65) Prior Publication Data

US 2012/0236780 A1   Sep. 20, 2012

Related U.S. Application Data

(63) Continuation of application No. 11/770,327, filed on Jun. 28, 2007, now Pat. No. 8,165,058.

(60) Provisional application No. 60/892,362, filed on Mar. 1, 2007.

(51) Int. Cl.
*H04L 29/06* (2006.01)

(52) U.S. Cl.
USPC ............ 370/315; 370/312; 370/343; 370/469

(58) Field of Classification Search
USPC .......................... 370/315, 312, 329, 469, 252
See application file for complete search history.

(56) References Cited

U.S. PATENT DOCUMENTS

| | | | |
|---|---|---|---|
| 7,885,247 B2 * | 2/2011 | Ihm et al. | 370/349 |
| 2005/0255843 A1 | 11/2005 | Hilpisch et al. | |
| 2006/0159085 A1 | 7/2006 | Lee et al. | |
| 2006/0264172 A1 * | 11/2006 | Izumikawa et al. | 455/11.1 |
| 2007/0072604 A1 | 3/2007 | Wang | |
| 2007/0160021 A1 * | 7/2007 | Xhafa et al. | 370/338 |
| 2007/0177627 A1 * | 8/2007 | Raju et al. | 370/469 |
| 2008/0049707 A1 * | 2/2008 | Kwon et al. | 370/343 |
| 2008/0247372 A1 | 10/2008 | Chion et al. | |
| 2008/0285501 A1 * | 11/2008 | Zhang et al. | 370/315 |
| 2011/0116394 A1 | 5/2011 | Stanwood et al. | |

OTHER PUBLICATIONS

Antoniou, Thanasis et al. "A New Energy Efficient and Fault-Tolerant Protocol for Data Propagation in Smart Dust Networks Using Varying Transmission Range;" In Annual Simulation Symposium (ANSS). ACM/IEEE, 2004.Field of Invention.

* cited by examiner

*Primary Examiner* — Andrew Chriss
*Assistant Examiner* — Mohamed Kamara
(74) *Attorney, Agent, or Firm* — Dirk Brinkman; Gene Vinokur

(57) ABSTRACT

The invention provides a data structure embodied in a computer readable media. The data structure is a protocol data packet (PDU) communicated in a mobile multihop network between stations. The data structure includes a relay media access header, a payload and an optional cyclical redundancy checksum for the protocol data unit, and an indication whether the PDU is a relay media access protocol data unit or not.

17 Claims, 5 Drawing Sheets

| HT = 0 (1) | RSV (1) | RMI (1) | RSV (3) | | CE (1) | RSV (1) |
|---|---|---|---|---|---|---|
| ESF (1) | RSV (1) | Priority (3) | | LEN (3) | | |
| LEN LSB (8) | | | | | | |
| CID #0 (MSB) (8) | | | | | | |
| CID #0 (LSB) (8) | | | | | | |
| HCS (8) | | | | | | |

| HT = 0 (1) | RSV (1) | RMI (1) | RSV (3) | | LEN (4) | | CE (1) | RSV (1) |
|---|---|---|---|---|---|---|---|---|
| ESF (1) | | Priority (3) | | | | | | |
| LEN LSB (8) ||||||||||
| CID #0 (MSB) (8) ||||||||||
| CID #0 (LSB) (8) ||||||||||
| HCS (8) ||||||||||

PROTOCOL DATA UNITS AND HEADER IN MULTIHOP RELAY NETWORK

RELATED APPLICATIONS

This application is a continuation of application Ser. No. 11/770,327 filed on Jun. 28, 2007 now U.S. Pat. No. 8,165,058, entitled "Protocol Data Units and Header in Multihop Relay Network," by Zhifeng Tao which claims priority to U.S. Provisional Patent Application 60/892,362, filed on Mar. 1, 2007. Both applications are incorporated herein by reference.

FIELD OF THE INVENTION

This invention relates generally to wireless communication networks, and more particularly to protocol data units in mobile multihop relay networks.

BACKGROUND OF THE INVENTION

Orthogonal frequency-division multiplexing (OFDM) is a modulation technique used at the physical layer (PHY) of a number of wireless networks, e.g., networks designed according to the IEEE 802.11a/g, and IEEE 802.16/16e standards. OFDMA is a multiple access scheme based on OFDM. In OFDMA, separate sets of orthogonal tones (subchannels) and time slots are allocated to multiple transceivers (users) so that the transceivers can communicate concurrently. As an example, the IEEE 802.16/16e standard has adopted OFDMA as the multiple channel access mechanism for non-line-of-sight (NLOS) communications at frequencies below 11 GHz.

In a conventional OFDMA-based cellular network, e.g., a wireless network according to the IEEE 802.16/16e standard, incorporated herein by reference. The network confines operations to a point-to-multipoint topology, wherein only two types of network entity exist, namely base stations (BS), and mobile stations (MS). The BS manages and coordinates all communications with the MS in a particular cell. Each MS is in direct communication with only the BS, and only the BS communicates with an infrastructure or "backbone" of the network. That is, there is only one hop between the MS and the BS. All communications between the MS must pass through the BS. Furthermore, there is one connection between the BS and each MS.

Due to significant loss of signal strength along the connection for certain spectrum, the coverage area of wireless service is often of limited geographical size. In addition, blocking and random fading frequently results in areas of poor reception, or even dead spots. Conventionally, this problem has been addressed by deploying BSs in a denser manner. However, the high cost of BSs and potential increase in interference, among others, render this approach less desirable.

In an alternative approach, a relay-based network can be used. This network includes multiple mobile stations (MS) and/or subscriber stations (SS). A relatively low-cost relay station RS extends the range of the BS. Some of the stations can communicate directly with the BS. Other stations can communicate directly with the RS and indirectly with the BS. Obviously, communications on the link between the RS and BS or between two adjacent RSs (i.e., relay link) can become a bottleneck.

It is recognized that new functions need to be provided for protocols operating on links in mobile multihop relay (MMR) networks. For example, traffic forwarding and routing now becomes essential at a relay station (RS) because multiple hops can exist between the source and destination of the traffic. Moreover, new quality of service (QoS) and security challenges have to be addressed properly in the MMR network.

Unfortunately, the legacy format of the media access (MAC) protocol data unit (PDU) specified by the IEEE 802.16e standard is highly restrictive and rigid, and cannot be used without any extension or modification to support such a wide variety of needs particular for networks designed according to the IEEE 802.16j standard.

As a result, a proper format is needed for MAC PDU on relay link.

SUMMARY OF THE INVENTION

The invention provides a data structure embodied in a computer readable media. The data structure is a protocol data packet (PDU) communicated in a mobile multihop relay network between stations. The data structure includes a relay media access header, a payload and an optional cyclical redundancy checksum for the protocol data unit, and an indication whether the PDU is a relay media access protocol data unit or not.

BRIEF DESCRIPTION OF THE DRAWINGS

FIG. 3 is a block diagram of a format of a relay MAC PDU header when payload is included according to an embodiment of the invention;

FIG. 4 is a block diagram of a format of relay MAC PDU header when payload is included according to an embodiment of the invention.

DETAILED DESCRIPTION OF THE PREFERRED EMBODIMENTS

Definitions

For the sake of clarify and description of the invention, the following terms are defined and used accordingly herein.

Base Station (BS)

Equipment to provide wireless communication between subscriber equipment and an infrastructure or network backbone.

Subscriber Station (SS)

A generalized equipment set to provide communication between the subscriber and the base station (BS).

Mobile Station (MS)

A wireless transceiver intended to be used while in motion or at unspecified locations. The MS is always a subscriber station (SS) unless specifically specified otherwise.

Relay Station (RS)

A wireless transceiver whose function is to relay data and control information between other stations, and to execute processes that support multi-hop communications.

Connection

At a physical layer, a connection runs from an RF transmitter of a station via one or more transmit antennas through a wireless channel to an RF receiver of another station via one or more receive antennas. Physically, the connection communicates RF signals using a predetermined set of subchannels and time slots. At a logical layer, the portion of interest of the connection runs from a media access layer (MAC) of a protocol stack in the transmitter to the media access layer in the receiver. Logically, the connection caries the data and control information as a single bit stream.

MAC Service Data Unit (MSDU)

A set of data specified in a protocol of a given layer and including of protocol control information of that layer, and possibly user data of that layer.

MAC Protocol Data Unit (MPDU)

A protocol data unit of a given layer of a protocol including the service data unit coming from a higher layer and the protocol control information of that layer. A burst is a sequence of contiguous MPDUs that belong to the same connection.

Network Structure

Figure 5:
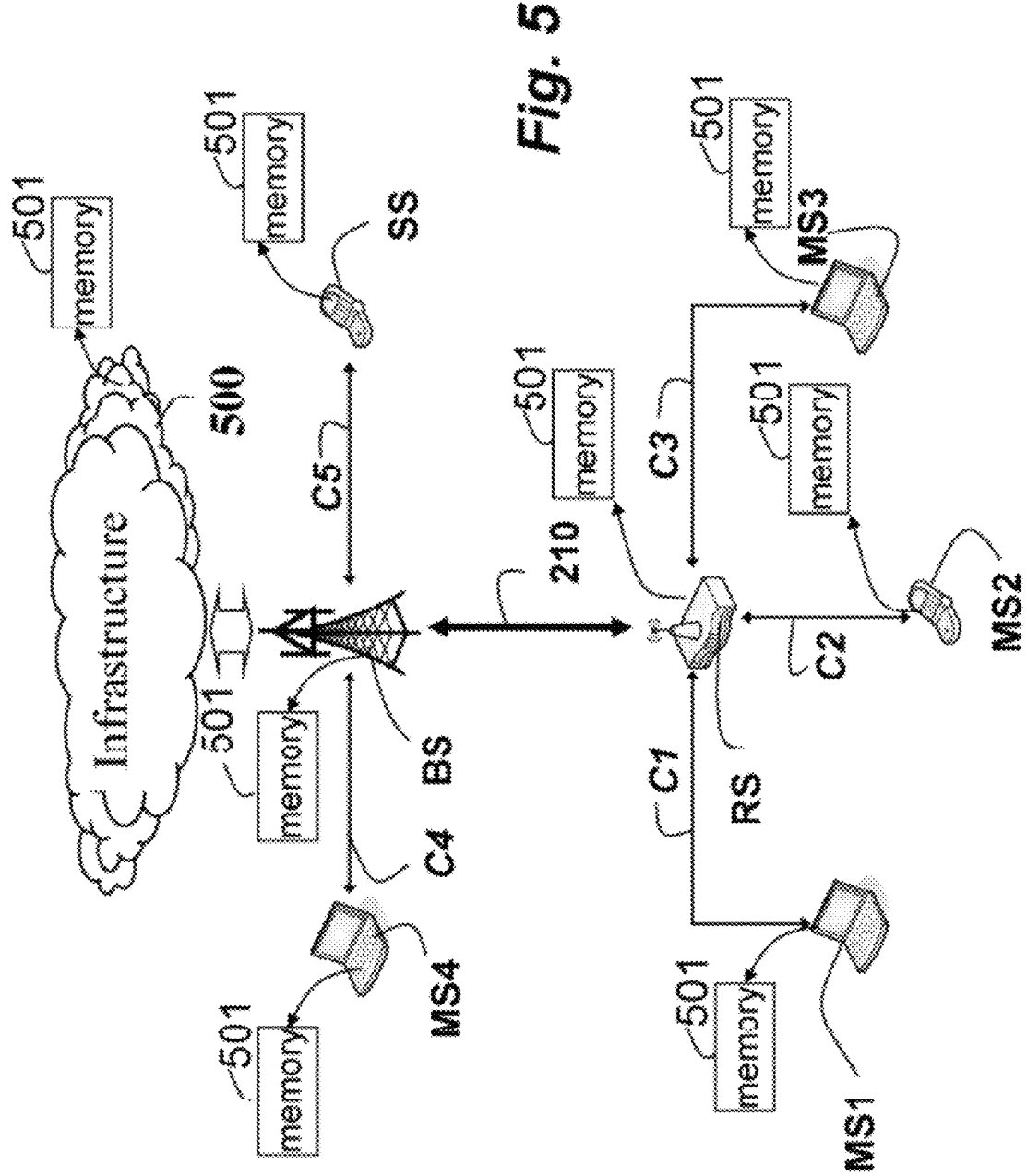
FIG. 5 is a block diagram of a multihop mobile relay (MMR) network according to an embodiment of the invention.

As shown in FIG. 5 for one embodiment of the invention, a network communicates packets from a set of mobile stations (MS) to a relay station (RS) using a set of connections (C1, C2, C3). There is one connection between each mobile station and the relay station. The relay station and a base station (BS) using a single connection 210 to communicate the packets. The BS can also communicate with other MS and SS using direct connections C4 and C5. The BS can communicate with an infrastructure 500. All the stations and the infrastructure 500 include computer readable media or memory 501 for storing the data structures according to the embodiments of the invention.

The packets can be communicated using OFDMA, which uses a predetermined set of frequencies and time periods. Time is partitioned into contiguous frames. Each frame can include a downlink (DL) and an uplink (UL) subframe. The basic unit of resource for allocation is a slot, which includes a number of OFDMA symbols in the time domain, and one subchannel in the frequency domain.

For clarity, herein, we refer to the MAC PDUs transmitted on relay links as relay MAC PDUs.

The format for the relay MAC PDU according to the embodiments of our invention is described below. Note that a relay MAC PDU can use the relay MAC PDU format, as exemplified below. A tunnel PDU is sent within a tunnel, and contains one or multiple MAC PDUs that follow the conventional IEEE 802.16e standard format and is collected from the access link. A PDU is sent on a relay link, which follows the conventional IEEE 802.16e standard format. Such a MAC PDU is be collected from the access link, or is generated by a RS. A PDU is sent on a relay link, which follows the relay MAC PDU format according to the embodiments of the invention. Such a MAC PDU is generated directly by a RS.

As described above, it is possible for MAC PDUs that follow the conventional IEEE 802.16e standard format and relay MAC PDU format described herein to coexist on relay links. Therefore, it is required that the relay MAC PDU format and the conventional IEEE 802.16e standard format is unambiguously distinguished on relay links.

In addition, the proposed relay MAC PDU format should be versatile enough to support a wide variety of new functions introduced in the IEEE 802.16j on relay link.

Furthermore, the relay MAC PDU format should be flexible enough for future extension.

The data structure or format of the relay MAC PDU is stored in computer-readable medium at any station that transmits or receives the relay MAC PDU. The data structure defines structural and functional interrelationships between the data structure and the computer software and hardware components in the stations and infrastructure 500, which permit the functionality of the data structure to be realized.

Relay MAC PDU Format

Figure 1:
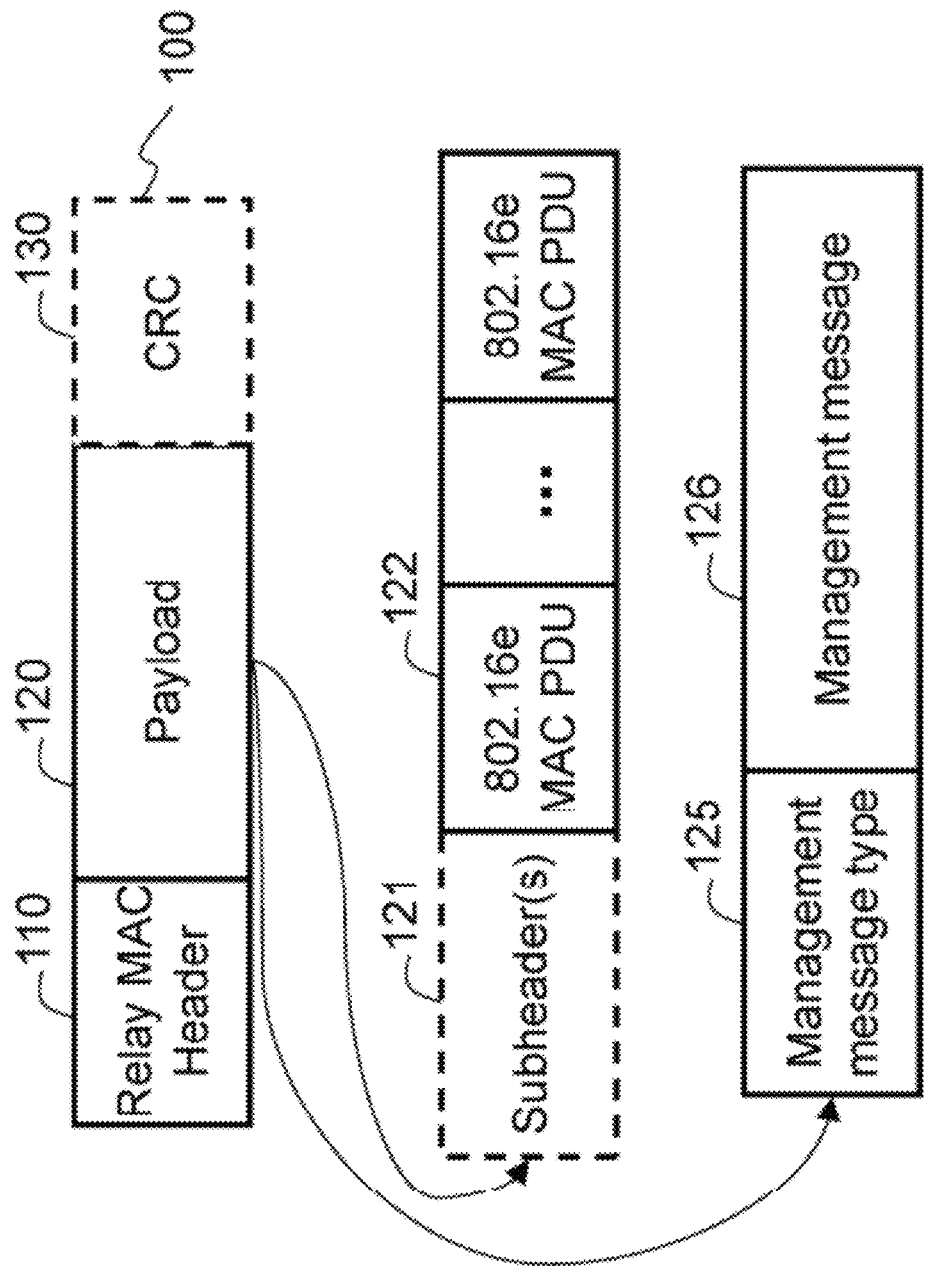
FIG. 1 is a block diagram of a format of relay MAC PDU according to an embodiment of the invention.

FIG. 1 shows the format of a relay MAC PDU 100 according to an embodiment of the invention. The MAC PDU includes a relay MAC header 110, a payload 120, and an optional cyclic redundancy check (CRC) 130. In one format, the payload 120, depending on the header 110, can include subheaders 121, and MAC PDUs 122. The relay MAC subheaders are optional. These can be used to convey information needed by a wide variety of signaling and management function, e.g., QoS, security, routing. In another format, the payload is a management message type 125 and management message 126.

Relay MAC Header Format

Figure 2:
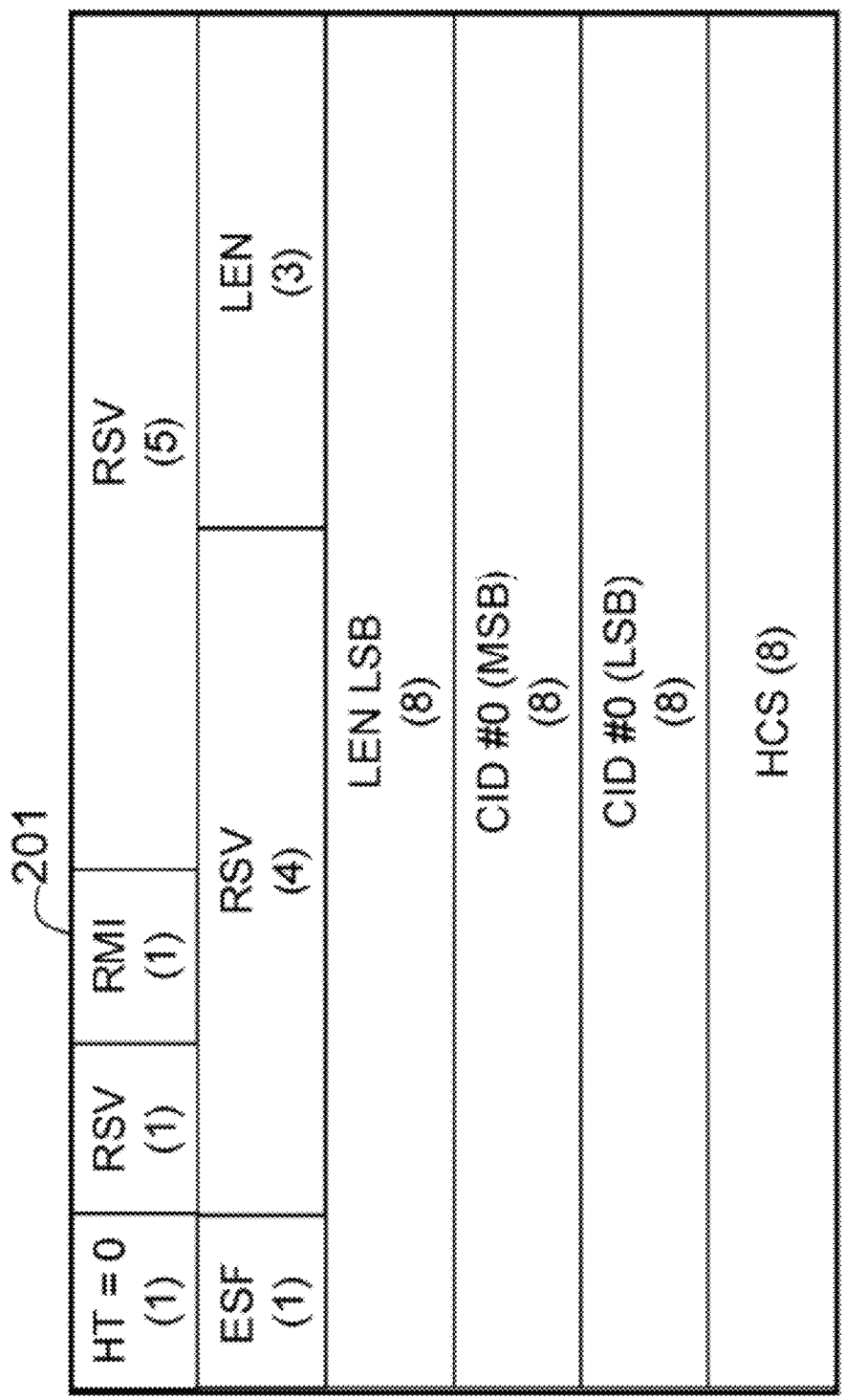
FIG. 2 is a block diagram of a format of a relay MAC PDU header when payload is included according to an embodiment of the invention.

FIGS. 2-4 show various formats. Because of the large number of fields the reference numerals have been omitted for clarity. The meanings of the terms are self explanatory or defined in the referenced standard.

FIG. 2 shows the format for the MAC PDU header 110 when payload is included. The header includes the following fields: header type (HT), reserved (RSV), relay mode indication (RMI) 201, reserved (RSV), extended subheader field (ESF), reserved (RSV), length (LEN), CID, and header check sequence (HCS). The RMI bit 201 indicates whether this protocol data unit is a relay media access control protocol data unit or not.

The one bit HT field can be used to indicate whether the MAC PDU contains payload or not, similar to the HT bit in the conventional IEEE 802.16e standard MAC PDU header. Note that since the relay MAC header defined herein only applies for the relay MAC PDU with payload, the HT bit in the relay MAC header essentially always has the value of 0.

The relay mode indication (RMI) bit 201 is used to distinguish the relay MAC PDU according to the invention from a conventional 802.16e MAC PDU. More specifically, if RMI bit is set to 1, the header shall follow the relay MAC header format described herein. Otherwise, if RMI bit is set to 0, the header shall follow the 802.16e generic MAC header format. Meanwhile, note that this bit was used in 802.16e generic MAC header to indicate whether mesh subheader would appear after the generic MAC header. So, if an 802.16j capable station (e.g., MS, RS, BS) is operating in a mobile multihop relay network, this bit in the relay MAC PDU header shall be interpreted as a relay mode indication bit. Otherwise, if a station is a conventional 802.16d/16e station or it operates in a conventional 802.16d/16e network, then this bit shall be interpreted as a mesh subheader bit.

For relay MAC PDUs that contain some payload, these PDUs are forwarded by the RS to the destination. To support various routing design, the relay MAC PDU header can contain a tunnel CID or basic CID of a RS. Given the range of CID value, RS is able to determine whether it is a tunnel CID or a basic CID.

The header format for relay MAC PDU shown in FIG. 2 is further described in Table 1.

TABLE 1

Format of Relay MAC PDU Header

| Syntax | Size | Notes |
| --- | --- | --- |
| MAC Header( ) { | | |
|   HT | 1 bit | |
|   if (HT == 0) { | | |
|     Reserved | 1 bit | Currently reserved. Content is subject to further |

TABLE 1-continued

Format of Relay MAC PDU Header

| Syntax | Size | Notes |
|---|---|---|
| | | discussion |
| RMI | 1 bit | Mesh subheader/Relay mode indication<br>When the value of MAC version TLV is less than 6, this is a mesh subheader bit<br>1 = mesh subheader is present,<br>0 = mesh subheader is absent<br>When the value of MAC version TLV is 6, this is a relay mode indication bit<br>1 = relay MAC header is used,<br>0 = generic MAC header is used. |
| Reserved | 5 bits | Currently reserved. Content is subject to further discussion |
| ESF | 1 bit | Extended subheader field.<br>If ESF = 0, the extended subheader is absent.<br>If ESF = 1, the extended subheader is present and will follow the GMH immediately.<br>The ESF is applicable both in the DL and in the UL. |
| Reserved | 4 bit | Currently reserved. Content is subject to further discussion |
| LEN | 11 bits | |
| CID | 16 bits | May be tunnel CID or basic CID of the RS |
| HCS<br>} | 8 bits | Header check sequence |
| else if (HT == 1) {<br>  Use legacy 802.16e or 802.16j<br>  Format | 39 bits | If no payload is attached |
| HCS<br>}<br>} | 8 bits | |

There are totally 10 bits in the relay MAC header that have been set to "reserved". The meaning of these bits can be further defined to support various new functions, such as CID encapsulation, traffic prioritization, etc., in a mobile multihop relay network.

For example, as shown in FIG. 3, the $7^{th}$ bit in the relay MAC header, which is set to "reserved" now, can be used to indicate whether CID encapsulation (CE) is used nor not in the relay MAC PDU. Another example is to use 3 bits ($11^{th}$ to $13^{th}$ bit) in the header to indicate the priority of the associated relay MAC PDU.

Since a relay MAC PDU may contain multiple 802.16e MAC PDUs, the length field may need to be extended. If that is the case, we can expand the LEN field leftward by 1 bit to make it 12 bits in the relay MAC PDU header. Thus, the maximum total length of a relay MAC PDU supported by the length field becomes 4096 bytes, which should be sufficient to support the aggregation of most types of the traffic. Then, the priority field has to be shifted leftward by 1 bit accordingly, as shown in FIG. 4.

Besides the new features described above, the relay MAC PDU header resembles the conventional MAC header as defined in the IEEE 802.16e standard.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A station in a mobile multihop relay network comprising:
   memory for storing a data structure, the data structure being a protocol data packet for communication in the mobile multihop relay network, the data structure comprising:
   a relay media access control (MAC) header, a payload and an optional cyclical redundancy checksum for a protocol data unit (PDU), in which the relay MAC header further comprises a header type field, a first reserved bit field, a relay mode indication field, a second reserved bit field, an extended subheader field, a third reserved bit field, a length field, a connection identifier field, and a header check sequence field, and wherein the five bits that immediately follow the relay mode indication bit constitute the second reserved field, wherein one of the reserved fields can indicate whether connection identifier encapsulation (CE) is used or not in the relay MAC PDU; and
   a transceiver for reading the relay mode indication field to determine whether the PDU is a relay MAC PDU or not, wherein the transceiver transmits the protocol data packet based on the determination.

2. The station of claim 1, in which the payload further comprises zero or more extended subheaders, zero or more subheaders, zero or more IEEE 802.16e MAC PDUs, and zero or more relay MAC PDUs.

3. The station of claim 1, in which the first bit in the relay MAC header is a header type field used to indicate whether this MAC PDU has payload or not.

4. The station of claim 3, in which the header type field is always set to a value that indicates that this MAC PDU has payload.

5. The station of claim 1, in which the bit that immediately follows the header type field constitutes the first reserved bit field.

6. The station of claim 1, in which the bit that immediately follows the first reserved bit field is the relay mode indication field, when the station involved in the communication supports IEEE 802.16j standard communications.

7. The station of claim 6, in which the relay mode indication field indicates whether this MAC header abides with generic MAC header format defined in the IEEE 802.16d/802.16e standard.

8. The station of claim 7, in which the relay mode indication field indicates that this MAC header abides with generic MAC header format defined in the IEEE 802.16d/802.16e standard, when the relay mode indication field is equal to 0.

9. The station of claim 7, in which the relay mode indication field indicates that this MAC header abides with relay MAC header format, when the relay mode indication field is equal to 1.

10. The station of claim 1, in which the bit that immediately follows the first reserved bit field is the mesh subheader field, when the station involved in the communication only supports the IEEE 802.16d/802.16e standard.

11. The station of claim 1, in which the bit that immediately follows the second reserved field is the extended subheader field bit, which is used to indicate whether there is any extended subheader after this relay MAC header or not.

12. The station of claim 1, in which the four bits that immediately follows the extended subheader field bit constitute the third reserved bit field.

13. The station of claim 12, in which three consecutive bits of the four-bit third reserved field are used to indicate the MAC PDU.

14. The station of claim 1, in which the eleven bits that immediately follow the third reserved field constitute the length field, which is used to indicate a total length in bytes of the MAC PDU.

15. The station of claim 14, in which the eleven-bit length field is extended leftward by one bit to be twelve bits, and represents a longer size of the MAC PDU.

16. The station of claim 1, in which the sixteen bits that immediately follow the length field is the connection identifier field, which contains the connection identifier of the connection belonging to the MAC PDU.

17. The station of claim 1, in which the eight bits that immediately follow the connection identifier field is the header checksum field, which contains a checksum of the relay MAC header.

* * * * *